Nov. 18, 1924.
T. F. SHARTZER
1,516,127
VEHICLE LICENSE PLATE
Filed Aug. 31, 1920
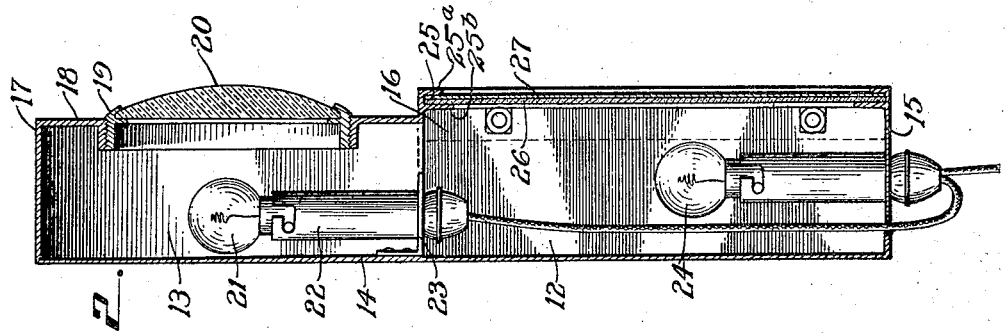
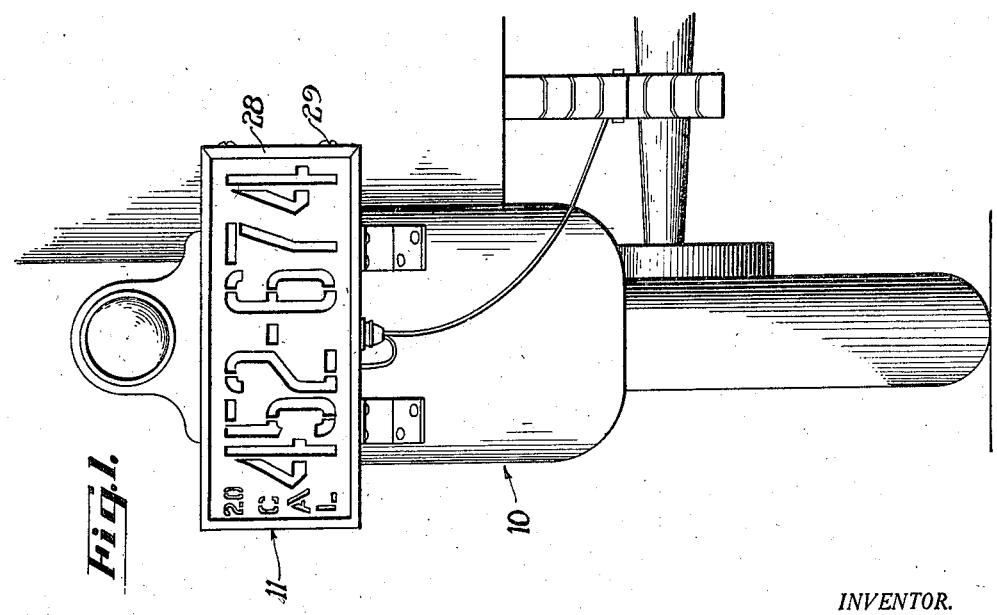
INVENTOR.
THOMAS F. SHARTZER
BY Chas. E. Townsend
ATTORNEYS.

Patented Nov. 18, 1924.

1,516,127

UNITED STATES PATENT OFFICE.

THOMAS F. SHARTZER, OF OAKLAND, CALIFORNIA.

VEHICLE LICENSE PLATE.

Application filed August 31, 1920. Serial No. 407,127.

*To all whom it may concern:*

Be it known that I, THOMAS F. SHARTZER, citizen of the United States, residing at Oakland, in the county of Alameda and State of California, have invented a new and useful Improvement in Vehicle License Plates, of which the following is a specification.

This invention relates to a display device and particularly pertains to a vehicle license plate.

At the present time police authorities are experiencing considerable trouble in apprehending the drivers of speeding vehicles, particularly due to the fact that the license plates are naturally obscured, or in criminal cases have been purposely obscured. It is the principal object of the present invention to provide a means for displaying a license plate which will prevent it from being obscured either in the day time or at night, and which will insure that it will be legible at all times. It being a further object of the invention to provide a license plate display structure readily adapted for use by various States and permitting an unlimited latitude in design without requiring alterations in the device. It is a further object of the present invention to combine the display device with the tail light structure of the vehicle, so that at night the lack of illumination of the license plate will be accompanied by a lack of illumination of the tail light, thus making the driver a violator of the various laws and ordinances relative to vehicle illumination.

The present invention contemplates the use of a lamp house having an illuminated display field which is preferably covered with a translucent screen covered with an opaque stencil carrying the license number and other data, in a manner to cause the translucent back ground to stand in contrast to the body portion of the opaque field, and thereby render the inscriptions legible in the daytime as well as permit them to be illuminated through a translucent screen, said screen and stencil member being removably disposed relative to said housing. The lamp house also embodying a tail light structure for the vehicle.

The invention is illustrated by way of example in the accompanying drawings, in which—

Figure 1 is a view in elevation showing a fragmentary portion of a vehicle, with the present invention applied thereto.

Fig. 2 is an enlarged vertical section through the display device.

Referring more particularly to the drawings: 10 indicates a vehicle upon which is mounted the display device 11, with which the present invention is particularly concerned. This device comprises a rectangular lamp house 12 and a tail light lamp house 13. These compartments are formed by a back plate 14 carrying side and end walls 15 and 16 by which the rectangular lamp house 12 is formed, while the tail light construction comprises a marginal wall 17 supporting a front plate 18. This plate has a centrally threaded opening therein to receive a threaded bezel 19 carrying a lens 20. This lens may be of any desired color, preferably red, and is illuminated by a light 21 supported in a mounting 22. This mounting is preferably carried upon a bracket 23 secured to the back plate 14.

The interior of the compartments 12 and 13 are preferably treated or painted to prevent absorption of light and to insure that maximum illumination will be produced by the tail light 21 and one or more lights 24 within the compartments 12. The two compartments communicate with each other, so that the combined illuminating action of all the lamps will be obtained.

The outer marginal edge of the walls 15 and one of the walls 16 are formed with grooves 25, defined by inwardly turned marginal flange 25$^a$ and the second flange 25$^b$ and along which a translucent screen 26 and an opaque stencil lamp 27 may be moved, to become seated in the position shown in Figure 1. The end wall 16, over which these members are passed, is then provided with a removable frame member 28, which is secured in place by bolts or screws 29. It is to be noted that the inner flange 25$^b$ is of greater width than the marginal flange 25$^a$ and provides an increased supporting area for the translucent screen so that the same cannot be easily forced inwardly into the casing.

The translucent screen is preferably formed of glass having a white color, while the opaque stencil disposed thereover is made of sheet metal through which letters and figures are cut, as prescribed by the various license laws and ordinances. The outer face of the stencil is preferably painted a color contrasting with the color of the translucent field in the rear thereof, so that the letters and figures will be readily discerned in the daytime. Of course, the translucent screen may be illuminated at night by the lamps 21 and 24 and will display the characters to advantage. This structure makes it possible for different States to select the colors desired for a license plate and to form the license plates in the shape of the stencil indicated at 27, which may be readily mounted across the opening of the compartment 13 and over a glass 26 of any prescribed color.

It will thus be evident that the present invention provides an illuminated license plate for day and night service, which plate is operated in conjunction with the tail light disposed adjacent thereto, whereby the illumination of the tail light and the license plate must be brought about at the same time, and further provides a license plate which is always visible and legible, thereby preventing criminals and reckless drivers from getting away from the scene of their criminal deeds without detection.

While I have shown the preferred form of my invention as now known to me, it will be understood that various changes in the construction, combination and arrangement of parts may be made by those skilled in the art, without departing from the spirit of the invention as claimed.

Having thus described my invention, what I claim and desire to secure by Letters Patent is:

A device of the character described, comprising a casing having rear, side and upper and lower front walls, the front walls each having an opening therein, a lens in one of the openings, the other wall having an inwardly bent marginal flange defining the opening therein, a second inwardly directed flange within the casing spaced from the marginal flange to form a pocket and being of greater width than the marginal flange to provide an increased supporting area, a translucent screen within the pocket and a stenciled opaque license plate fitting between the flanges and resting against the translucent screen the plate and screen being of contrasting colors.

In testimony whereof I have hereunto set my hand in the presence of two subscribing witnesses.

THOMAS F. SHARTZER.

Witnesses:
  W. W. HEALLY,
  M. E. EWING.